(12) United States Patent
Moulin

(10) Patent No.: US 11,440,482 B2
(45) Date of Patent: Sep. 13, 2022

(54) TRACK ASSEMBLY

(71) Applicant: Lear Corporation, Southfield, MI (US)

(72) Inventor: Antoine Moulin, Aurec-sur-Loire (FR)

(73) Assignee: Lear Corporation, Southfield, MI (US)

( * ) Notice: Subject to any disclaimer, the term of this patent is extended or adjusted under 35 U.S.C. 154(b) by 861 days.

(21) Appl. No.: 16/215,090

(22) Filed: Dec. 10, 2018

(65) Prior Publication Data
US 2020/0180516 A1    Jun. 11, 2020

(51) Int. Cl.
*B60P 7/08* (2006.01)
*B60R 11/00* (2006.01)
*F16M 13/02* (2006.01)
*B60N 2/08* (2006.01)

(52) U.S. Cl.
CPC ............ *B60R 11/00* (2013.01); *B60N 2/0843* (2013.01); *B60P 7/0815* (2013.01); *F16M 13/02* (2013.01); *B60R 2011/0084* (2013.01); *F16M 2200/027* (2013.01)

(58) Field of Classification Search
CPC .......... B60N 2/0843; B60R 2011/0084; B60R 9/048; B60R 9/058; F16M 2200/027; B60P 7/0815
USPC ...................................................... 410/104
See application file for complete search history.

(56) References Cited

U.S. PATENT DOCUMENTS

| | | |
|---|---|---|
| 2,126,143 A | 8/1938 | McGregor |
| 2,263,554 A | 11/1941 | Brach |
| 2,480,622 A | 8/1949 | Warnock |
| 2,678,082 A | 5/1954 | Nathan |
| 2,724,966 A | 11/1955 | Northrop |
| 3,181,102 A | 4/1965 | Fehr |
| 3,213,403 A | 10/1965 | Hermann |
| 3,268,848 A | 8/1966 | Adams |
| 3,940,182 A | 2/1976 | Tamura |
| 4,020,769 A | 5/1977 | Keir |
| 4,198,025 A | 4/1980 | Lowe et al. |

(Continued)

FOREIGN PATENT DOCUMENTS

| CA | 2060715 A1 | 8/1993 |
|---|---|---|
| CN | 103241146 A | 8/2013 |

(Continued)

OTHER PUBLICATIONS

Co-Pending U.S. Appl. No. 16/597,187, filed Oct. 9, 2019.

(Continued)

*Primary Examiner* — Bradley Duckworth
(74) *Attorney, Agent, or Firm* — Fishman Stewart PLLC

(57) ABSTRACT

A track assembly includes a track and/or a support assembly. The support assembly may be configured for connection with the track. The support assembly may include a housing, a support member, an actuator, a rod, a latch, and/or an engagement portion. The engagement portion may extend from the latch. The engagement portion may be configured to selectively engage an inner surface of the track. The housing may include a longitudinal axis and/or the actuator may be configured to rotate about the longitudinal axis. The latch may include a first position, a second position, and/or a third position. When the latch is in the third position, the engagement portion may be configured not to engage the track. The engagement portion may be configured to contact the track when the latch is in the first position.

18 Claims, 10 Drawing Sheets

(56) References Cited

U.S. PATENT DOCUMENTS

| | | | |
|---|---|---|---|
| 4,243,248 A | 1/1981 | Scholz et al. | |
| 4,282,631 A | 8/1981 | Uehara et al. | |
| 4,500,020 A * | 2/1985 | Rasor | B60R 9/045 |
| | | | 224/321 |
| 4,511,187 A | 4/1985 | Rees | |
| 4,575,295 A | 3/1986 | Rebentisch | |
| 4,607,991 A | 8/1986 | Porter | |
| 4,618,808 A | 10/1986 | Ish-Shalom et al. | |
| 4,707,030 A | 11/1987 | Harding | |
| 4,711,589 A | 12/1987 | Goodbred | |
| 4,776,809 A | 10/1988 | Hall | |
| 4,830,531 A | 5/1989 | Condit et al. | |
| 4,961,559 A | 10/1990 | Raymor | |
| 4,969,621 A | 11/1990 | Munchow et al. | |
| 4,987,316 A | 1/1991 | White et al. | |
| 5,082,228 A * | 1/1992 | Shimazaki | B60N 2/0715 |
| | | | 248/430 |
| 5,137,331 A | 8/1992 | Colozza | |
| 5,167,393 A | 12/1992 | Hayakawa et al. | |
| 5,192,045 A | 3/1993 | Yamada et al. | |
| 5,222,814 A | 6/1993 | Boelryk | |
| 5,322,982 A | 6/1994 | Leger et al. | |
| 5,332,290 A | 7/1994 | Borlinghaus et al. | |
| 5,348,373 A | 9/1994 | Stiennon | |
| 5,446,442 A | 8/1995 | Swart et al. | |
| 5,466,892 A | 11/1995 | Howard et al. | |
| 5,489,172 A * | 2/1996 | Michler | B64C 1/20 |
| | | | 244/118.1 |
| 5,489,173 A | 2/1996 | Hofle | |
| 5,582,381 A | 12/1996 | Graf et al. | |
| 5,599,086 A | 2/1997 | Dutta | |
| 5,618,192 A | 4/1997 | Drury | |
| 5,655,816 A | 8/1997 | Magnuson et al. | |
| 5,676,341 A | 10/1997 | Tarusawa et al. | |
| 5,696,409 A | 12/1997 | Handman et al. | |
| 5,701,037 A | 12/1997 | Weber et al. | |
| 5,796,177 A | 8/1998 | Werbelow et al. | |
| 5,800,015 A | 9/1998 | Tsuchiya et al. | |
| 5,899,532 A | 5/1999 | Paisley et al. | |
| 5,918,847 A | 7/1999 | Couasnon | |
| 5,921,606 A | 7/1999 | Moradell et al. | |
| 5,964,442 A | 10/1999 | Wingblad et al. | |
| 5,964,815 A | 10/1999 | Wallace et al. | |
| 6,036,157 A | 3/2000 | Baroin et al. | |
| 6,113,051 A | 9/2000 | Moradell et al. | |
| 6,142,718 A | 11/2000 | Kroll | |
| 6,150,774 A | 11/2000 | Mueller et al. | |
| 6,166,451 A | 12/2000 | Pigott | |
| 6,216,995 B1 | 4/2001 | Koester | |
| 6,227,595 B1 | 5/2001 | Hamelin et al. | |
| 6,299,230 B1 | 10/2001 | Oettl | |
| 6,318,802 B1 | 11/2001 | Sjostrom et al. | |
| 6,357,814 B1 | 3/2002 | Boisset et al. | |
| 6,400,259 B1 | 6/2002 | Bourcart et al. | |
| 6,405,988 B1 | 6/2002 | Taylor et al. | |
| 6,422,596 B1 | 7/2002 | Fendt et al. | |
| 6,439,531 B1 | 8/2002 | Severini et al. | |
| 6,480,144 B1 | 11/2002 | Miller et al. | |
| 6,691,971 B2 * | 2/2004 | Yamada | B60N 2/0705 |
| | | | 248/430 |
| 6,693,368 B2 | 2/2004 | Schumann et al. | |
| 6,710,470 B2 | 3/2004 | Bauer et al. | |
| 6,719,350 B2 | 4/2004 | Duchateau et al. | |
| 6,736,458 B2 | 5/2004 | Chabanne et al. | |
| 6,772,056 B2 | 8/2004 | Mattes et al. | |
| 6,805,375 B2 | 10/2004 | Enders et al. | |
| 6,851,708 B2 | 2/2005 | Kazmierczak | |
| 6,882,162 B2 | 4/2005 | Schirmer et al. | |
| 6,960,993 B2 | 11/2005 | Mattes et al. | |
| 7,042,342 B2 | 5/2006 | Luo et al. | |
| 7,113,541 B1 | 9/2006 | Lys et al. | |
| 7,159,899 B2 | 1/2007 | Nitschke et al. | |
| 7,170,192 B2 | 1/2007 | Kazmierczak | |
| 7,207,541 B2 | 4/2007 | Frohnhaus et al. | |
| 7,271,501 B2 | 9/2007 | Dukart et al. | |
| 7,293,831 B2 | 11/2007 | Greene | |
| 7,300,091 B2 | 11/2007 | Nihonmatsu et al. | |
| 7,322,605 B2 | 1/2008 | Ventura et al. | |
| 7,348,687 B2 | 3/2008 | Aichriedler et al. | |
| 7,363,194 B2 | 4/2008 | Schlick et al. | |
| 7,388,466 B2 | 6/2008 | Ghabra et al. | |
| 7,416,042 B2 | 8/2008 | Czaykowska et al. | |
| 7,434,883 B2 | 10/2008 | Deptolla | |
| 7,454,170 B2 | 11/2008 | Goossens et al. | |
| 7,455,535 B2 | 11/2008 | Insalaco et al. | |
| 7,505,754 B2 | 3/2009 | Kazmierczak et al. | |
| 7,523,913 B2 | 4/2009 | Mizuno et al. | |
| 7,556,233 B2 | 7/2009 | Gryp et al. | |
| 7,560,827 B2 | 7/2009 | Jacas-Miret et al. | |
| 7,633,301 B2 | 12/2009 | Steenwyk et al. | |
| 7,661,637 B2 | 2/2010 | Mejuhas et al. | |
| 7,665,939 B1 | 2/2010 | Cardona | |
| 7,739,820 B2 | 6/2010 | Frank | |
| 7,744,386 B1 | 6/2010 | Speidel et al. | |
| 7,980,525 B2 | 7/2011 | Kostin | |
| 7,980,798 B1 | 7/2011 | Kuehn et al. | |
| 8,010,255 B2 | 8/2011 | Darraba | |
| 8,146,991 B2 | 4/2012 | Stanz et al. | |
| 8,278,840 B2 | 10/2012 | Logiudice et al. | |
| 8,282,326 B2 | 10/2012 | Krostue et al. | |
| 8,376,675 B2 | 2/2013 | Schulze et al. | |
| 8,463,501 B2 | 6/2013 | Jousse | |
| 8,536,928 B1 | 9/2013 | Gagne et al. | |
| 8,648,613 B2 | 2/2014 | Ewerhart et al. | |
| 8,702,170 B2 | 4/2014 | Abraham et al. | |
| 8,757,720 B2 | 6/2014 | Hurst, III et al. | |
| 8,800,949 B2 | 8/2014 | Schebaum et al. | |
| 8,857,778 B2 | 10/2014 | Nonomiya | |
| 8,936,526 B2 | 1/2015 | Boutouil et al. | |
| 8,967,719 B2 | 3/2015 | Ngiau et al. | |
| RE45,456 E | 4/2015 | Sinclair et al. | |
| 9,010,712 B2 | 4/2015 | Gray et al. | |
| 9,018,869 B2 | 4/2015 | Yuasa et al. | |
| 9,045,061 B2 | 6/2015 | Kostin et al. | |
| 9,162,590 B2 | 10/2015 | Nagura et al. | |
| 9,174,604 B2 | 11/2015 | Wellhoefer et al. | |
| 9,227,528 B2 * | 1/2016 | Yamada | B60N 2/0818 |
| 9,242,580 B2 | 1/2016 | Schebaum et al. | |
| 9,318,922 B2 | 4/2016 | Hall et al. | |
| 9,340,125 B2 | 5/2016 | Stutika et al. | |
| 9,346,428 B2 | 5/2016 | Bortolin | |
| 9,422,058 B2 | 8/2016 | Fischer et al. | |
| 9,561,770 B2 | 2/2017 | Sievers et al. | |
| 9,610,862 B2 | 4/2017 | Bonk et al. | |
| 9,663,232 B1 | 5/2017 | Porter et al. | |
| 9,673,583 B2 | 6/2017 | Hudson et al. | |
| 9,701,217 B2 | 7/2017 | Eckenroth et al. | |
| 9,731,628 B1 | 8/2017 | Rao et al. | |
| 9,758,061 B2 | 9/2017 | Pluta et al. | |
| 9,789,834 B2 | 10/2017 | Rapp et al. | |
| 9,796,304 B2 | 10/2017 | Salter et al. | |
| 9,815,425 B2 | 11/2017 | Rao et al. | |
| 9,821,681 B2 | 11/2017 | Rao et al. | |
| 9,840,220 B2 | 12/2017 | Van Buskirk et al. | |
| 9,862,291 B2 * | 1/2018 | Inoue | B60N 2/0843 |
| 9,919,624 B2 | 3/2018 | Cziomer et al. | |
| 9,950,682 B1 | 4/2018 | Gramenos et al. | |
| 10,059,232 B2 | 8/2018 | Frye et al. | |
| 10,160,351 B2 | 12/2018 | Sugimoto et al. | |
| 10,479,227 B2 | 11/2019 | Nolte et al. | |
| 10,493,243 B1 | 12/2019 | Braham | |
| 10,549,659 B2 | 2/2020 | Sullivan et al. | |
| 10,654,378 B2 | 5/2020 | Pons | |
| 2005/0046367 A1 | 3/2005 | Wevers et al. | |
| 2005/0089367 A1 | 4/2005 | Sempliner | |
| 2005/0150705 A1 | 7/2005 | Vincent et al. | |
| 2005/0211835 A1 | 9/2005 | Henley et al. | |
| 2005/0215098 A1 | 9/2005 | Muramatsu et al. | |
| 2005/0230543 A1 | 10/2005 | Laib et al. | |
| 2005/0258676 A1 | 11/2005 | Mitchell et al. | |
| 2006/0131470 A1 | 6/2006 | Yamada et al. | |
| 2006/0208549 A1 | 9/2006 | Hancock et al. | |
| 2006/0220411 A1 | 10/2006 | Pathak et al. | |

(56) References Cited

U.S. PATENT DOCUMENTS

| | | | |
|---|---|---|---|
| 2006/0263163 A1* | 11/2006 | Harberts | B61D 45/001 410/104 |
| 2008/0021602 A1 | 1/2008 | Kingham et al. | |
| 2008/0084085 A1 | 4/2008 | Mizuno et al. | |
| 2008/0090432 A1 | 4/2008 | Patterson et al. | |
| 2008/0279649 A1 | 11/2008 | Womack et al. | |
| 2009/0129105 A1 | 5/2009 | Kusu et al. | |
| 2009/0251920 A1 | 10/2009 | Kino et al. | |
| 2009/0302665 A1 | 12/2009 | Dowty | |
| 2009/0319212 A1 | 12/2009 | Cech et al. | |
| 2010/0117275 A1 | 5/2010 | Nakamura | |
| 2011/0024595 A1 | 2/2011 | Oi et al. | |
| 2012/0112032 A1 | 5/2012 | Kohen | |
| 2013/0020459 A1 | 1/2013 | Moriyama et al. | |
| 2013/0035994 A1 | 2/2013 | Pattan et al. | |
| 2013/0037585 A1* | 2/2013 | Hubbard | F16B 7/0473 224/324 |
| 2014/0263920 A1 | 9/2014 | Anticuar et al. | |
| 2014/0265479 A1 | 9/2014 | Bennett | |
| 2015/0048206 A1 | 2/2015 | Deloubes | |
| 2015/0069807 A1 | 3/2015 | Kienke | |
| 2015/0083882 A1 | 3/2015 | Stutika et al. | |
| 2015/0191106 A1 | 7/2015 | Inoue et al. | |
| 2015/0236462 A1 | 8/2015 | Davidson, Jr. et al. | |
| 2016/0039314 A1 | 2/2016 | Anticuar et al. | |
| 2016/0154170 A1 | 6/2016 | Thompson et al. | |
| 2016/0236613 A1 | 8/2016 | Trier | |
| 2017/0080825 A1 | 3/2017 | Bonk et al. | |
| 2017/0080826 A1 | 3/2017 | Bonk et al. | |
| 2017/0166093 A1 | 6/2017 | Cziomer et al. | |
| 2017/0261343 A1 | 9/2017 | Lanter et al. | |
| 2017/0291507 A1 | 10/2017 | Hattori et al. | |
| 2018/0017189 A1 | 1/2018 | Wegner | |
| 2018/0039917 A1 | 2/2018 | Buttolo et al. | |
| 2018/0086232 A1 | 3/2018 | Kume | |
| 2018/0105072 A1 | 4/2018 | Pons | |
| 2018/0148011 A1 | 5/2018 | Zaugg et al. | |
| 2018/0183623 A1 | 6/2018 | Schoenfeld et al. | |
| 2018/0275648 A1 | 9/2018 | Ramalingam | |
| 2019/0001846 A1 | 1/2019 | Jackson et al. | |
| 2019/0084453 A1 | 3/2019 | Petit et al. | |
| 2019/0126786 A1 | 5/2019 | Dry et al. | |
| 2019/0337413 A1 | 11/2019 | Romer | |
| 2019/0337414 A1 | 11/2019 | Condamin et al. | |
| 2019/0337415 A1 | 11/2019 | Condamin et al. | |
| 2019/0337416 A1 | 11/2019 | Condamin et al. | |
| 2019/0337417 A1 | 11/2019 | Condamin et al. | |
| 2019/0337418 A1 | 11/2019 | Condamin et al. | |
| 2019/0337419 A1 | 11/2019 | Condamin et al. | |
| 2019/0337420 A1 | 11/2019 | Condamin et al. | |
| 2019/0337421 A1 | 11/2019 | Condamin et al. | |
| 2019/0337422 A1 | 11/2019 | Condamin et al. | |
| 2019/0337471 A1 | 11/2019 | Brehm | |
| 2019/0379187 A1 | 12/2019 | Christensen et al. | |
| 2019/0389336 A1 | 12/2019 | Malinowski et al. | |
| 2020/0001745 A1* | 1/2020 | Shimizu | B60N 2/0818 |
| 2020/0009995 A1 | 1/2020 | Sonar | |
| 2020/0055423 A1 | 2/2020 | Prozzi et al. | |
| 2020/0079244 A1 | 3/2020 | Carbone et al. | |
| 2020/0189504 A1 | 6/2020 | Ricart et al. | |
| 2020/0189511 A1 | 6/2020 | Ricart et al. | |
| 2020/0194936 A1 | 6/2020 | Ricart et al. | |
| 2020/0194948 A1 | 6/2020 | Lammers et al. | |
| 2020/0207241 A1 | 7/2020 | Moulin et al. | |
| 2020/0262367 A1 | 8/2020 | Fernandez Banares et al. | |
| 2020/0269754 A1 | 8/2020 | Ricart et al. | |
| 2020/0282871 A1 | 9/2020 | Ricart et al. | |
| 2020/0282880 A1 | 9/2020 | Jones et al. | |
| 2021/0016685 A1* | 1/2021 | Bilgincan | B60N 2/0818 |

FOREIGN PATENT DOCUMENTS

| | | |
|---|---|---|
| CN | 203190203 U | 9/2013 |
| CN | 203799201 U | 8/2014 |
| DE | 3710476 A1 | 10/1987 |
| DE | 29712180 U1 | 9/1997 |
| DE | 202005013714 U1 | 12/2005 |
| DE | 102005007430 A1 | 3/2006 |
| DE | 102006022032 A1 | 12/2006 |
| DE | 102010017038 A1 | 2/2011 |
| DE | 102010063615 A1 | 2/2012 |
| DE | 102011056278 A1 | 2/2013 |
| DE | 202014102336 U1 | 6/2014 |
| DE | 102014217754 A1 | 3/2015 |
| DE | 102015212100 A1 | 12/2015 |
| DE | 112015000380 T5 | 10/2016 |
| DE | 102016113409 A1 | 4/2017 |
| EP | 0565973 A1 | 10/1993 |
| EP | 0783990 A1 | 7/1997 |
| EP | 863043 A1 | 9/1998 |
| EP | 1176047 A1 | 1/2002 |
| EP | 1209024 A1 | 5/2002 |
| EP | 1431104 A2 | 6/2004 |
| EP | 2298609 B1 | 3/2011 |
| EP | 1699661 B1 | 8/2012 |
| EP | 3150426 A1 | 4/2017 |
| FR | 2762814 A1 | 11/1998 |
| FR | 2864481 B1 | 4/2006 |
| FR | 2951329 A1 | 4/2011 |
| FR | 2986751 A1 | 8/2013 |
| GB | 191027984 A | 4/1911 |
| JP | 3314591 B2 | 8/2002 |
| JP | 2003227703 A | 8/2003 |
| JP | 2005119518 A | 5/2005 |
| JP | 2007112174 A | 5/2007 |
| JP | 2008158578 A | 7/2008 |
| JP | 4222262 B2 | 2/2009 |
| JP | 2013230721 A | 11/2013 |
| WO | 01/87665 A1 | 11/2001 |
| WO | 2003002256 A2 | 1/2003 |
| WO | 2004098943 A1 | 11/2004 |
| WO | 2005068247 A2 | 7/2005 |

OTHER PUBLICATIONS

Co-Pending U.S. Appl. No. 16/672,989, filed Nov. 4, 2019.
Co-Pending U.S. Appl. No. 16/711,661, filed Dec. 12, 2019.
Copending U.S. Appl. No. 16/215,127, filed Dec. 10, 2019.
Translation of Office Action obtained from Espacenet Global Dossier for corresponding Chinese Application 2019111123614, dated Mar. 22, 2021.

* cited by examiner

TRACK ASSEMBLY

TECHNICAL FIELD

The present disclosure generally relates to a track assembly, including track assemblies that may be used in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some track assemblies may be relatively complex and/or may not provide sufficient functionality. Some track assemblies may not be configured to selectively connect to a track.

There is a desire for solutions/options that minimize or eliminate one or more challenges or shortcomings of support assemblies. The foregoing discussion is intended only to illustrate examples of the present field and should not be taken as a disavowal of scope.

SUMMARY

In embodiments, a track assembly may include a track and/or a support assembly. The support assembly may be configured for connection with the track. The support assembly may include a housing, a support member, an actuator, a rod, a latch, and/or an engagement portion. The engagement portion may extend from the latch. The engagement portion may be configured to selectively engage an inner surface of the track. The housing may include a longitudinal axis, and/or the actuator may be configured to rotate about the longitudinal axis. The latch may include a first position, a second position, and/or a third position. When the latch is in the third position, the engagement portion may be configured not to engage the track. The engagement portion may be configured to contact the track when the latch is in the first position. When the latch is in the first position, movement of the support assembly may be limited in three directions. The engagement portion may be configured not to engage the track when the latch is in the second position. When the latch is in the second position, movement of the support assembly may be limited in two directions. The actuator may be configured to move the latch between a first position, a second position, and/or a third position. When the latch may be in the first position, one or more clamp portions of the actuator may be engaged with respective support portions of the housing to clamp the latch with the track and/or substantially prevent longitudinal movement of the support assembly relative to the track. When the latch may be in the first position, engagement of the clamp portions with the respective support portions may provide a vertically clamping force to the latch onto an underside of the track. When the latch may be in the second position and/or the third position, the one or more clamp portions may be disengaged from the respective support portions and/or the rod may be disposed in a bottom portion of the aperture.

With embodiments, the housing may include a first housing member that may be connected to a second housing member. Lower portions of the first housing member and/or the second housing member may be configured for insertion into the track. Upper portions of the first housing member and/or the second housing member may be configured to contact top sides of the track. The support member may include a first connector portion, and/or the first connector portion may be configured to support an object. The first connector portion and/or a second connector portion may be laterally oriented with respect to the housing. The actuator may be disposed at least partially in a second housing member of the housing. The first connector portion and/or the second connector portion may be connected to a first housing member of the housing.

In embodiments, a support assembly may include a housing, a support member, an actuator, and/or a latch. The housing may include a first housing member and/or a second housing member. The support member may be disposed at least partially in the housing. The latch may include an engagement portion. The actuator and/or the latch may be rotatably connected to the support member. The engagement portion may be configured to selectively engage a track. The support member may include a first support portion and/or a second support portion. The first support portion and/or the second support portion may extend laterally from the support member. The first support portion and/or the second support portion may be disposed in contact with a first protrusion and/or a second protrusion of the first housing member. The first housing member may include a first contact portion. The second housing member may include a second contact portion. The first contact portion and/or the second contact portion may be configured to support the support assembly on said track.

With embodiments, the support assembly may include a second support member and a second track. The second support member may be configured to selectively engage the second track. The second support member may be configured to cooperate with the first support member to support and/or restrict movement of an object. The support assembly may include a first connector portion that may be configured to at least partially receive a connector. The first connector portion may be configured to limit movement of an object in at least one direction in a vehicle. The first connector portion may be configured to support an object on said track.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
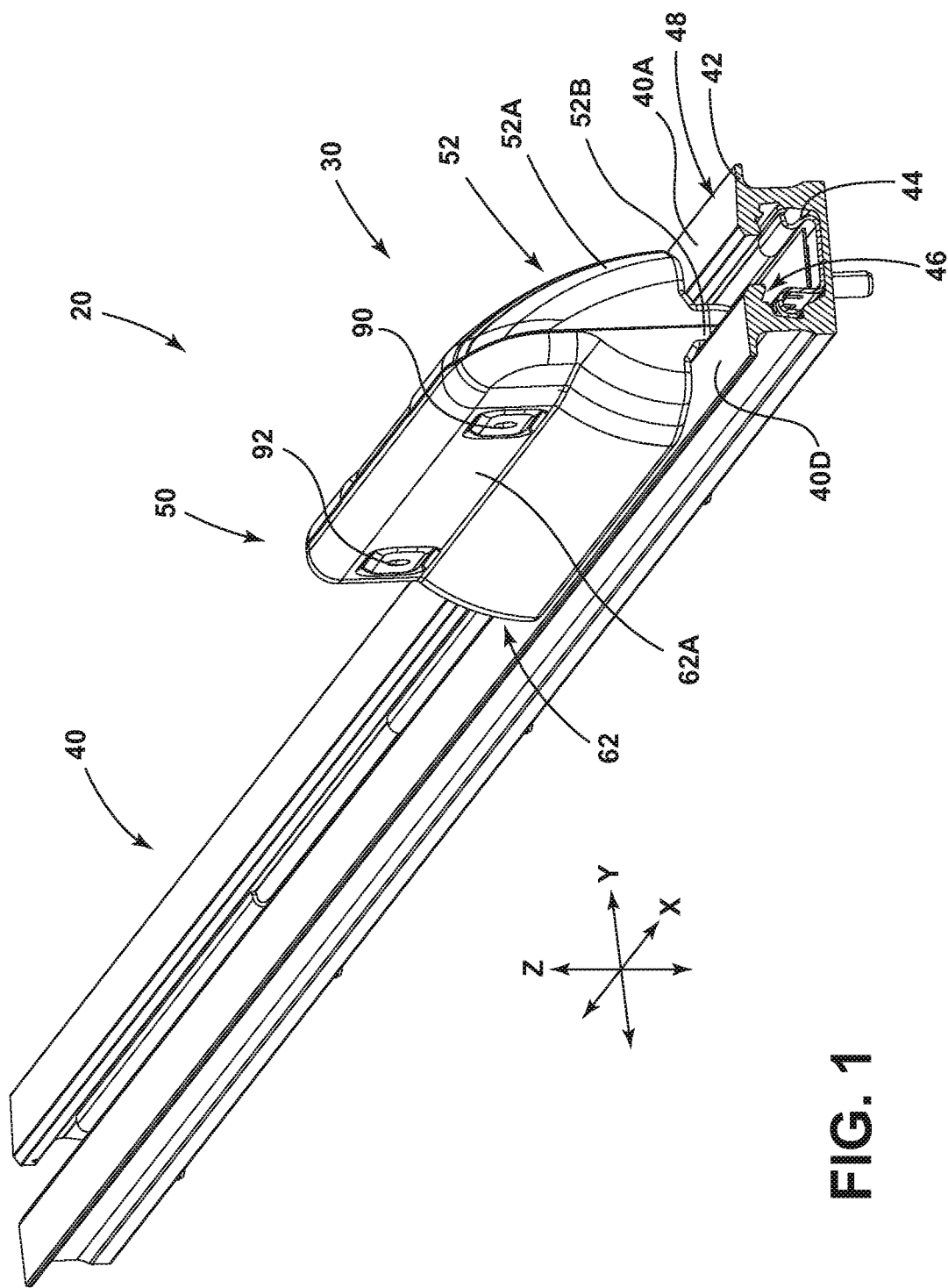
FIG. 1 is a perspective view of an embodiment of a track assembly according to teachings of the present disclosure.

In embodiments, such as generally illustrated in FIG. 1, a track assembly 20 may include a support assembly 30 and/or a track 40. The support assembly 30 may be configured to selectively engage the track 40. The track 40 may connected to one or more of a variety of mounting surfaces, such as those within a vehicle. The track 40 may include an outer track 42 and/or an inner track 44. The inner track 44 may be at least partially disposed within the outer track 42. The outer track 42 may include an inner surface 46 and/or an outer surface 48.

Figure 2:
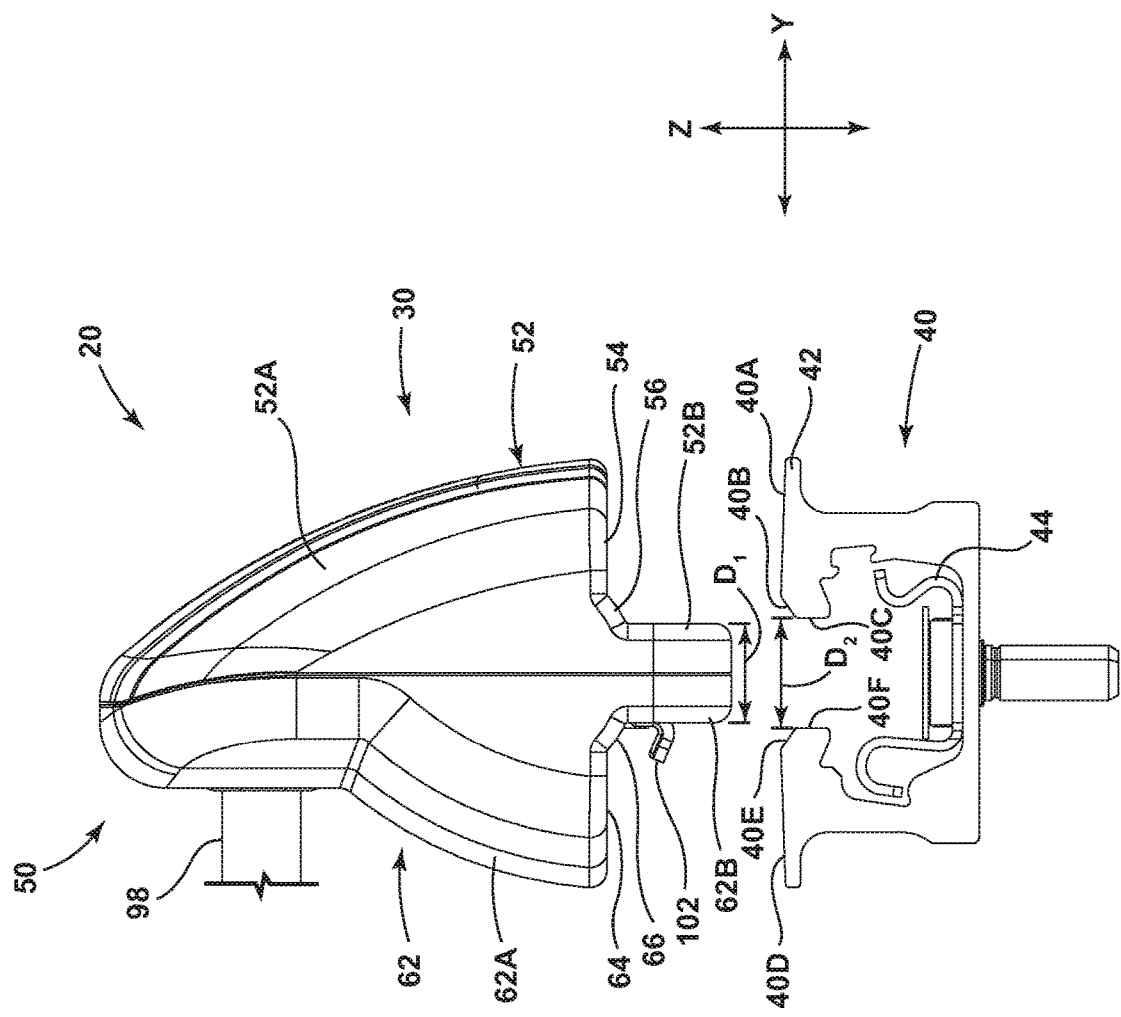
FIG. 2 is a side view of an embodiment of a track assembly according to teachings of the present disclosure.
Figure 3:
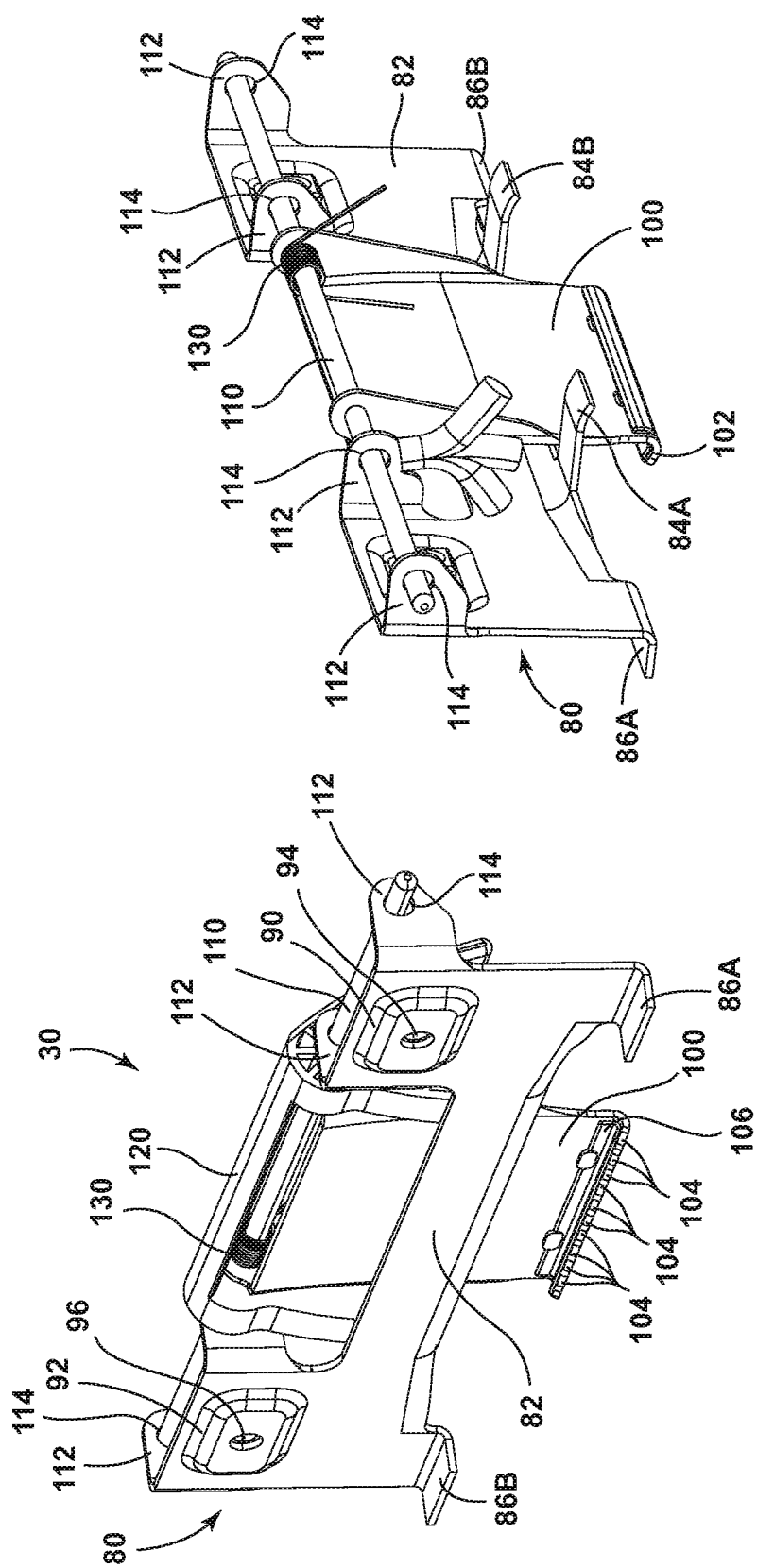
FIGS. 3A and 3B are perspective views of portions of embodiments of a support assembly according to teachings of the present disclosure.

With embodiments, such as generally illustrated in FIGS. 2, 3A, and 3B, a support assembly 30 may include a housing 50, a support member 80, a latch 100, and/or an actuator 120. An engagement portion 102 may be connected to the latch 100 and/or the actuator 120. The support assembly 30 may be configured to move longitudinally along the track 40, and/or the support assembly 30 may be configured to selectively connect to the track 40.

In embodiments, the housing 50 may include a first housing member 52 and/or a second housing member 62. The first housing member 52 may be disposed opposite the second housing member 62. The first housing member 52 and the second housing member 62 may connect to provide a generally enclosed space and/or chamber 58. The first housing member 52 and/or the second housing member 62 may include one or more of a variety of materials. For example and without limitation, the first housing member 52 and/or the second housing member 62 may include plastic (e.g., a polymer).

With embodiments, the first housing member 52 may include one or more of a variety of shapes, sizes, and/or configurations. The first housing member 52 may be substantially curved and/or planar (see, e.g., FIG. 2). The first housing member 52 may include an upper portion 52A and/or a lower portion 52B. The upper portion 52A may be configured to be disposed substantially above the track 40, and/or the the lower portion 52B may be configured to be disposed substantially in the track 40. The upper portion 52A may include a first contact portion 54 and/or a second contact portion 56. The first contact portion 54 may be configured to contact a first side 40A (e.g., top side) of the track 40, and/or the second contact portion 56 may be configured to contact a second side 40B (e.g., an oblique angled side) of the track 40. The lower portion 52B may be configured for alignment with and/or to contact a third side 40C (e.g., an inner side) of the track 40. The lower portion 52B may substantially rectangular.

In embodiments, the second housing member 62 may include one or more of a variety of shapes, sizes, and/or configurations. The second housing member 62 may be substantially curved and/or planar (see, e.g., FIG. 2). The second housing member 62 may include an upper portion 62A and/or a lower portion 62B. The upper portion 62A may include a third contact portion 64 and/or a fourth contact portion 66. The third contact portion 64 may be configured to contact a fourth side 40D (e.g., a top side) of the track 40, and/or the fourth contact portion 66 may be configured to contact a fifth side 40E (e.g., an oblique angled side) of the track 40. The lower portion 62B may be configured for alignment with and/or contact with a sixth side 40F (e.g., an inner side) of the track 40. The lower portion 62B may be substantially rectangular.

With embodiments, a combined width D1 of the lower portion 52B of the first housing member 52 and the lower portion 62B of the second housing member 62 may be less than the distance D2 between the third side 40C of the track 40 and a sixth side 40F of the track 40. The width of the lower portion 52B of the first housing member 52 may or may not be equal to the width of the lower portion 62B of the second housing member 62.

Figure 4:
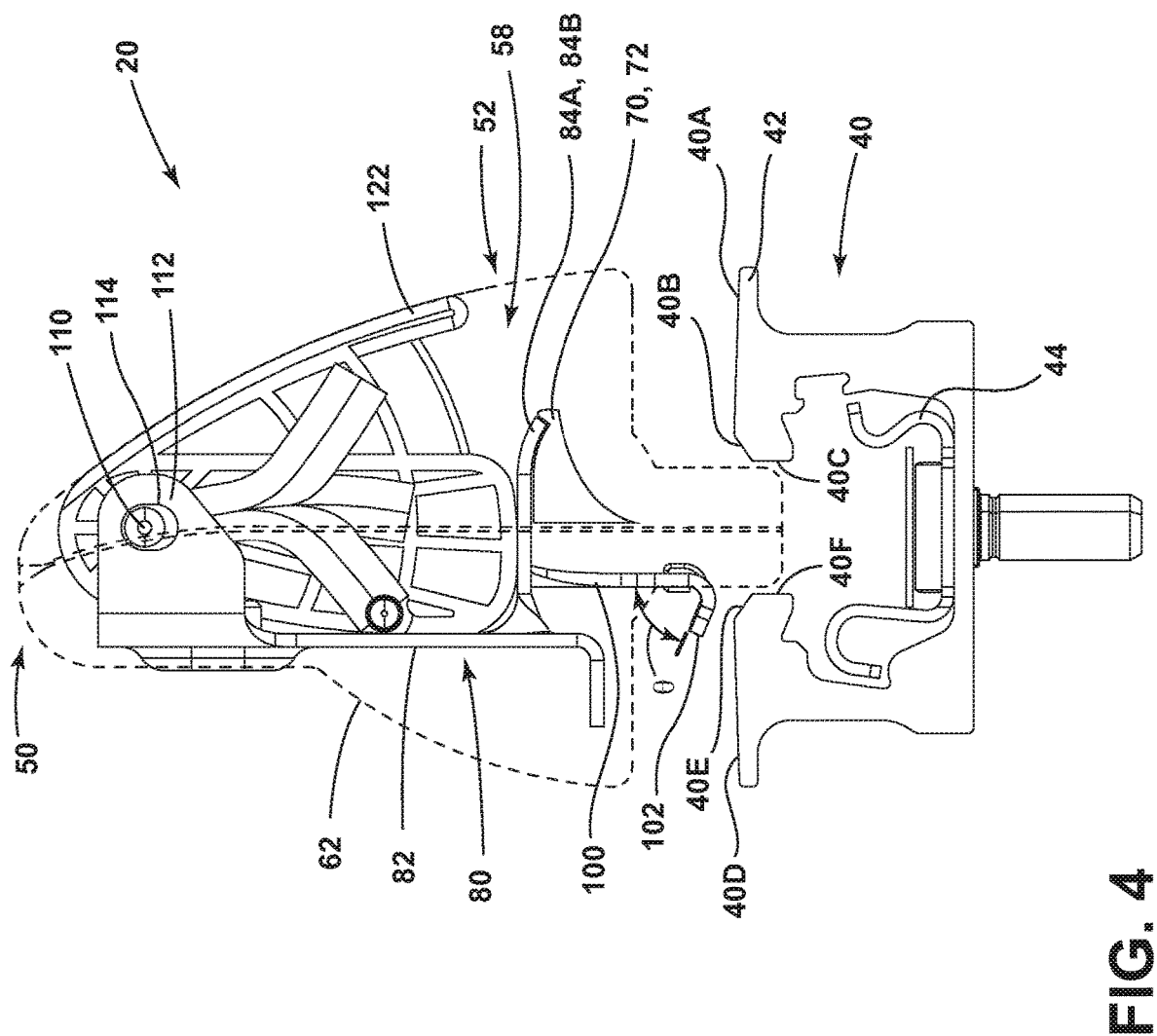
FIG. 4 is a sideview of an embodiment of a track assembly, with some portions hidden, according to teachings of the present disclosure.

In embodiments, such as generally illustrated in FIGS. 3A, 3B, and 4, the support assembly 30 may include a support member 80. The support member 80 may include one or more of a variety of shapes, sizes, and/or configurations. For example and without limitation, the support member 80 may be substantially planar. The support member 80 may include a body 82. The support member 80 may be substantially disposed in the first housing member 52, the second housing member 62, and/or the chamber 58. The support member 80 may include one or more of a variety of materials. For example and without limitation, the support member 80 may include a metal and/or alloy that may be strong enough to support the support assembly 30 on the track 40. The support member 80 may provide substantially all structural support for the support assembly 30 and/or the housing 50 may provide some structural support for the support assembly 30 (e.g., in the Y-direction).

With embodiments, such as generally illustrated in FIGS. 1 and 3A, the support member 80 may include a first support portion 84A and/or a second support portion 84B. The first support portion 84A and/or the second support portion 84B may extend from the body 82 (e.g., in the Y-direction). The support portions 84A, 84B may be generally planar. The first support portion 84A may contact a first protrusion 70 extending from the first housing member 52, and/or the second support portion 84B may contact a second protrusion 72 extending from the first housing member 52.

In embodiments, the support member 80 may include a third support portion 86A and/or a fourth support portion 86B that may extend from the body 82 of the support member 80 (e.g., in the Y-direction). The third support portion 86A and/or the fourth support portion 86B may extend from the body 82 in an opposite direction than the first support portion 84A and/or the second support portion 84B. The third support portion 86A and/or the fourth support portion 86B may contact at least a portion of the first housing member 52. The third support portion 86A and/or the fourth support portion 86B may be disposed within the upper portion 52A of the first housing member 52, and/or may contact the first contact portion 54. The support portions 84A, 84B, 86A, 86B may support the support assembly 30 on the track 40. The support member 80 may limit Z-direction forces on the track 40. A portion of the housing 50 (e.g., the upper portion 62A of the second housing member 62) may be disposed between (i) the third support portion 86A and/or the fourth support portion 86B and (ii) the track 40 (e.g., the fourth side 40D), which may restrict and/or prevent metal-to-metal contact between the support member 80 and the track 40.

With embodiments, such as generally illustrated in FIGS. 3A and 3B, the support member 80 may include a first connector portion 90 and/or a second connector portion 92. The first connector portion 90 and/or the second connector portion 92 may include one or more of a variety of shapes, sizes, and/or configurations. For example and without limitation, the first connector portion 90 and/or the second connector portion 92 may be generally rectangular. The connector portions 92, 92 may partially and/or completely extend through the first housing member 52 and/or the connector portions 90, 92 may be laterally orientated. The connector portions 90, 92 may include a first aperture 94 and/or a second aperture 96 that may be configured for connection with a fastener (e.g., bolt, screw, etc.). The connector portions 90, 92 may be configured for connection with a variety of securing elements that connect to cargo 98 (e.g., an object, bike, kayak, etc.) within a vehicle. The connector portions 90, 92 may connect the cargo 98 to the support assembly 30 and/or track 40 to limit movement of the cargo 98 in at least one direction (e.g., in an X-direction, a Y-direction, and/or a Z-direction).

In embodiments, such as generally illustrated in FIGS. 3A and 4, the support assembly 30 may include a latch 100. The latch 100 may be disposed at least partially in the housing 50 and/or the chamber 58. The latch 100 may include one or more of a variety of shapes, sizes, and/or configurations. For example and without limitation, the latch 100 may be generally planar and/or rectangular. The latch 100 may be disposed generally vertically (e.g., aligned with an X-Z plane). The latch 100 may include an engagement portion 102 that may be disposed at or about an end (e.g., a bottom end) of the latch 100. The latch 100 may include one or more of a variety of shapes, sizes, and/or configurations. For example and without limitation, the engagement portion 102 may be generally curved and/or hooked. The engagement portion 102 may extend from the latch 100 at an angle θ (e.g., an acute angle) relative to the rest of the latch 100. The engagement portion 102 may include one or more teeth 104 and/or a friction element 106 (see, e.g., FIG. 3A). The teeth 104 and/or the friction element 106 may be configured to contact the outer track 42 and restrict and/or prevent X-direction movement of the support member 80 along the track 40. The latch 100 may include one or more of a variety of materials. For example and without limitation, the latch 100 may include metal.

With embodiments, such as generally illustrated in FIGS. 3A and 3B, the support assembly 30 may include a rod 110 that may extend substantially in the X-direction. The rod 110 may be connected to the support member 80, the latch 100, and/or the first housing member 52. The support member 80 and/or the latch 100 may include a plurality of tabs 112 that may be configured to connect the rod 110 with the support member 80 and/or the latch 100 (and may limit movement of the rod 110 in at least one direction, such as in the Y and Z-directions). For example and without limitation, the tabs 112 may include apertures 114 configured to at least partially receive the rod 110. Some or all of the tabs 112 may extend substantially in the Y-direction and/or may substantially aligned with a Y-Z plane.

In embodiments, such as generally illustrated in FIGS. 3A and 4, the support assembly 30 may include an actuator 120. The actuator 120 may be disposed at least partially in the second housing member 62 and/or the chamber 58. The actuator 120 may be at least partially disposed in an aperture or recess 122 of the second housing member 62. The actuator 120 may include one or more of a variety of shapes, sizes, and/or configurations. For example and without limitation, the actuator 120 may be substantially curved and/or may be configured as a handle. A user may place a hand in the recess 122 of the second housing member 62 and pull on the actuator 120, which may cause rotation of the actuator 120.

With embodiments, such as generally illustrated in FIG. 3B, the actuator 120 may be connected to a biasing member 130. The biasing member 130 may be connected to the actuator 120, the latch 100, and/or the rod 110. The biasing member 130 may be a spring, and/or the biasing member 130 may rotationally bias the actuator 120 and/or the latch 100. The latch 100 may be biased by the biasing member 130 to a position where the latch 100 is generally flush with the support member 80. The actuator 120 may rotate with the latch 100 about/with the rod 110, and/or the actuator 120 and the latch 100 may be rotatably connected via the biasing member 130 and/or the rod 110. The support member 80 and/or the latch 100 may rotate about a longitudinal axis of the housing 50 (e.g., the rod 110) that may be substantially parallel to the track 40 and/or the X-direction.

Figure 5A:
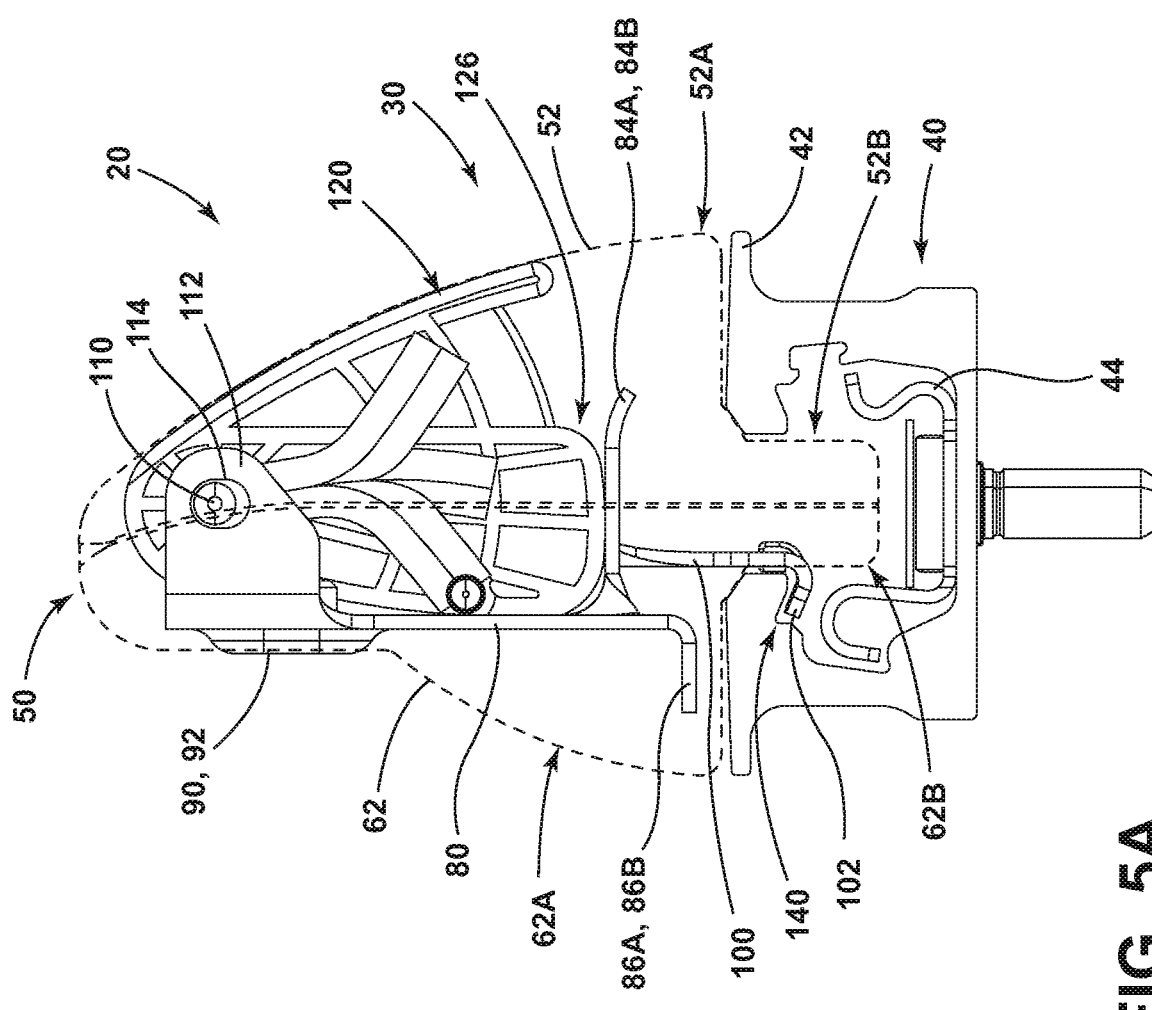
FIG. 5A is a side view of an embodiment of a track assembly, with a latch in a first position and with some portions hidden, according to teachings of the present disclosure.
Figure 5B:
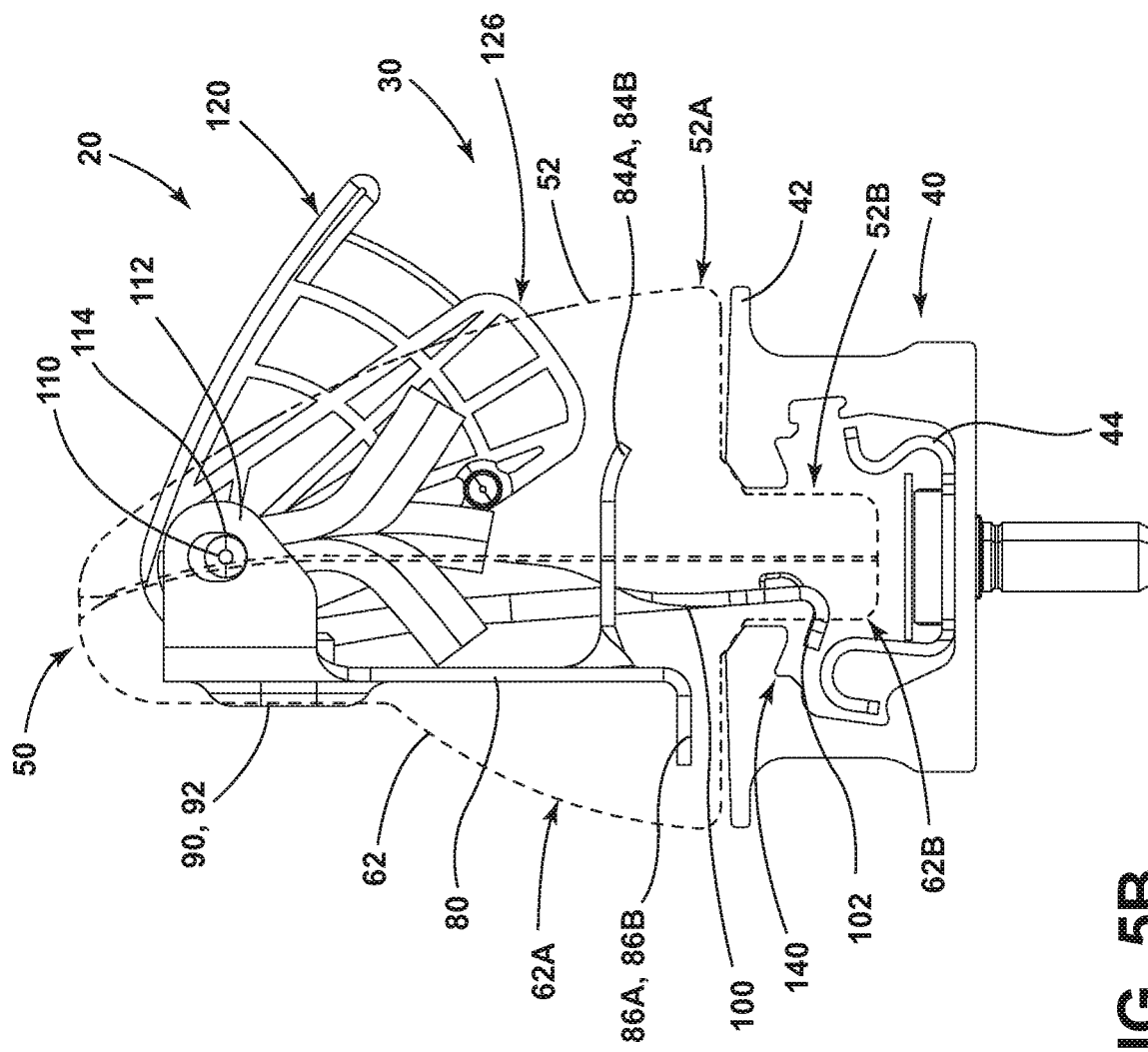
FIG. 5B is a side view of an embodiment of a track assembly, with a latch in a second position and with some portions hidden, according to teachings of the present disclosure.
Figure 5C:
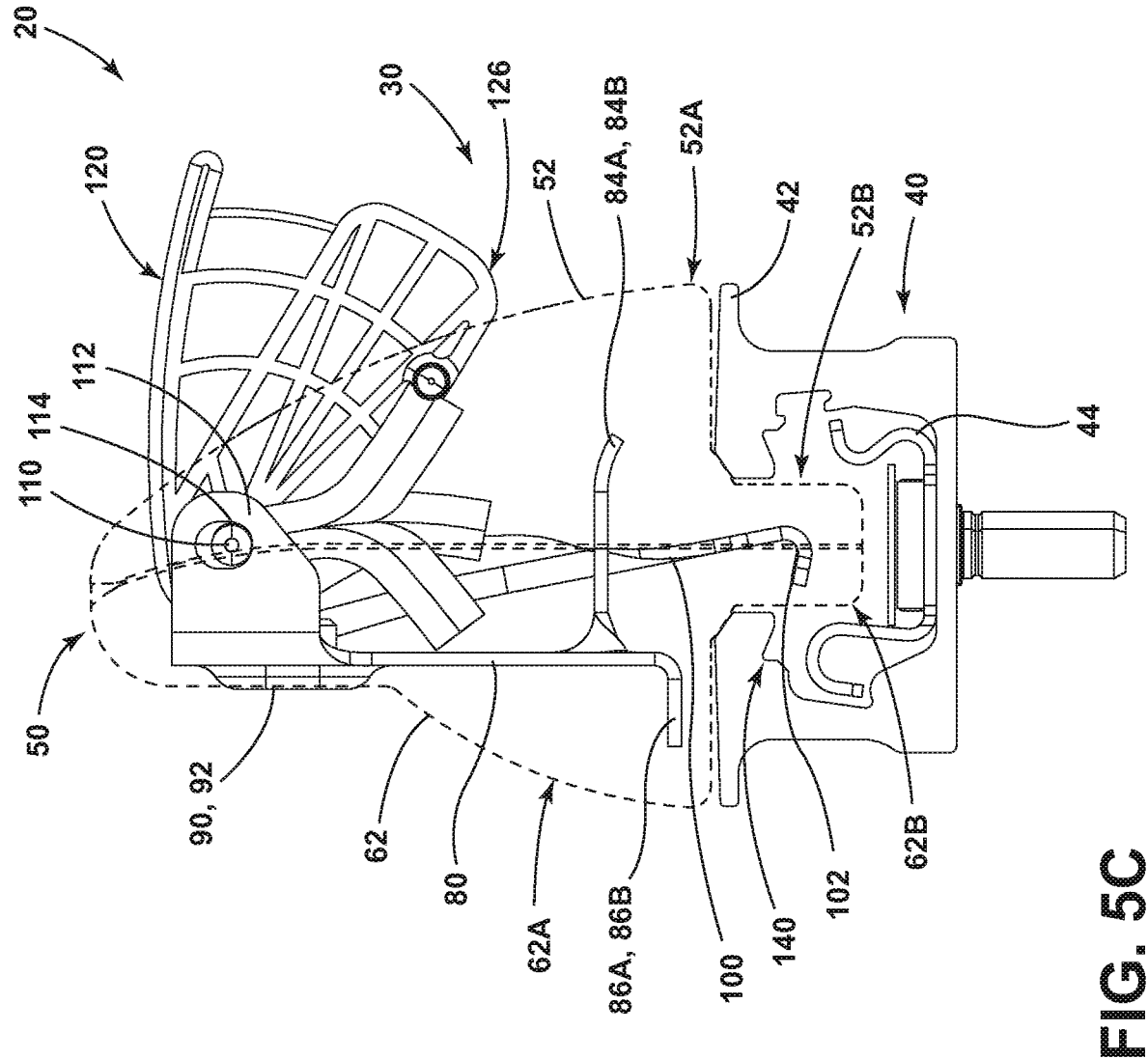
FIG. 5C is a side view of an embodiment of a track assembly, with a latch in a third position and with some portions hidden, according to teachings of the present disclosure.
Figure 5D:
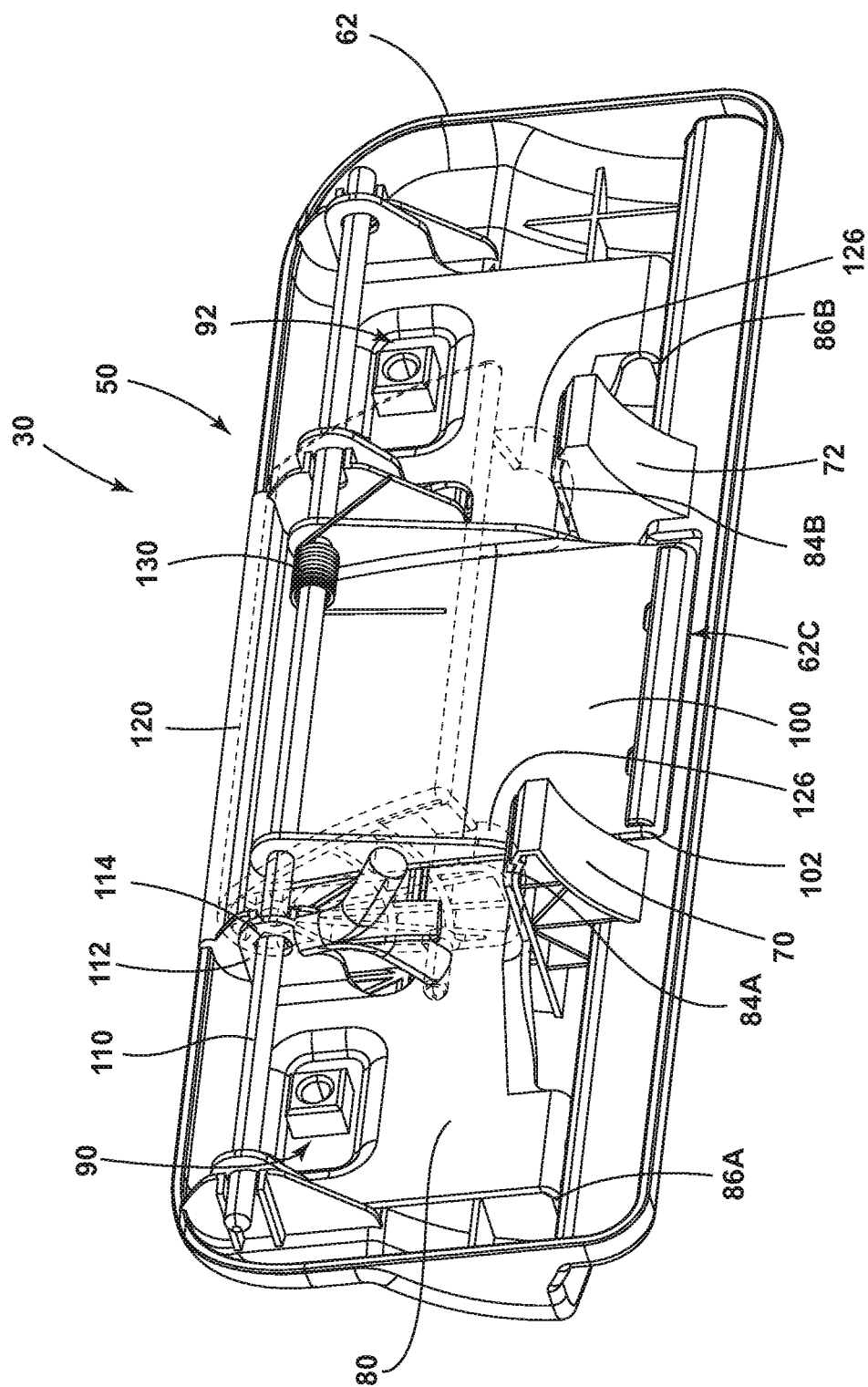
FIG. 5D is a perspective view of portions of an embodiment of a support assembly, with some portions shown as transparent or hidden, according to teachings of the present disclosure.

In embodiments, such as generally illustrated in FIGS. 5A, 5B, and 5C, the latch 100 may include a first position, a second position, and/or a third position. When the latch 100 is in the first position, the latch 100 may be engaged with an inner surface 46 of the outer track 42 such that movement of the support member 80 may be limited in at least two directions (e.g., the X-direction and/or the Z-direction), as shown in FIG. 5A. Movement of the support member 80 may be limited in the Y-direction when the latch 100 is in the first position. An outer surface of the actuator 120 may be aligned/flush with an outer surface of the second housing member 62. When the latch 100 is in the first position, the latch 100 may be offset from (e.g., not parallel to) the support member 80. The engagement portion 102 may protrude from the housing 50 and/or the second housing member 62. The latch 100 may extend outwards from the lower portion 62B, such as through an aperture 62C of the second housing member 62 (see, e.g., FIG. 5D). For example and without limitation, the engagement portion 102 may contact the inner surface 46 of the outer track 42 (see, e.g., FIG. 5A). With embodiments, contact between the engagement portion 102 and the inner surface 46 of the outer track 42 may limit vertical/Z-direction movement and/or lateral/Y-direction movement of the support member 80 relative to the track 40 (e.g., the engagement portion 102 may include a hooked configuration that may hook onto the outer track 42). The contact between the engagement portion 102 (e.g., the friction element 106 and/or the teeth 104) and the outer track 42 may limit movement (e.g., in the X-direction) of the support assembly 30 along the track 40. In the first position of the latch 100, some of the latch 100 (e.g., the engagement portion 102) may be disposed at least partially between (e.g., in the Z-direction) the outer track 42 and the inner track 44.

With embodiments, such as generally illustrated in FIG. 5A, when the latch 100 is in the first position, the first contact portion 54 may be in contact with the first side 40A of the outer track 42; the second contact portion 56 may be in contact with the second side 40B of the outer track 42;

and/or the lower portion 52B of the first housing member 52 may not be in contact with the third side 40C of the outer track 42. When the latch 100 is in the first position, the third contact portion 64 may be in contact with the fourth side 40D of the outer track 42; the fourth contact portion 66 may be in contact with the fifth side 40E of the outer track 42; and/or the lower portion 62B of the second housing member 62 may be in contact with the sixth side 40F of the outer track 42. The engagement portion 102 may be in contact with a groove 140 disposed on an inner surface 46 of the outer track 42. Contact between the upper portions 52A, 62A of the housing members 52, 62 and the track 40, the engagement portion 102 and the groove 140, and the lower portion 62B of the second housing member 62 and the track 40 may limit tilting (e.g., about an X-axis, Y-axis, and/or Z-axis of rotation) of the support assembly 30 on the track 40.

In embodiments, such as generally illustrated in FIG. 5B, the latch 100 may move from a first position to a second position. When moving to the second position, the latch 100 may rotate about/with the rod 110. The latch 100 may rotate between the first position that may not be parallel to the support member 80, to the second position that may be substantially parallel to the support member 80. In the second position, the engagement portion 102 may be disposed partially outside the housing 50, and/or the engagement portion 102 may limit movement of the support assembly 30 in at least one direction. The engagement portion 102 may limit Y-direction and/or Z-direction movement of the support assembly 30, and/or the engagement portion 102 may not limit X-direction movement of the support assembly 30 along the track 40. When the latch 100 is in the second position, the engagement portion 102 may not fully contact/engage the inner surface 46 of the outer track 42 such as to limit movement along the track 40. A frictional force between the engagement portion 102 and the outer track 42 may be less than an X-direction force on the support assembly 30.

With embodiments, the actuator 120 may be lifted and/or rotated to move the latch 100 between the first position and the second position. For example and without limitation, the actuator 120 may be rotated about 30 degrees (or more or less, depending on the configuration) to move the latch 100 between the first position and the second position. As the actuator 120 is rotated, the latch 100 may move with the actuator 120 via the biasing member 130. The actuator 120 may at least partially protrude from the outer surface of the second housing member 62 when the latch 100 is in the second position.

In embodiments, such as generally illustrated in FIG. 5C, the latch 100 may move from a second position to a third position. When moving to the third position, the latch 100 and/or actuator 120 may rotate about/with the rod 110. The latch 100 may rotate between the second position of the latch 100 that may be parallel to the support member 80 and the third position of the latch 100 that may not be parallel to the support member 80. In the third position, the engagement portion 102 may be disposed entirely in the housing 50, and/or the engagement portion 102 may not substantially limit movement of the support member 80 in the X-direction or the Z-direction. When the latch 100 is in the third position, the lower portions 52B, 62B of the first housing member 52 and the second housing member 62 may move between being disposed at least partially within the track 40 and being disposed entirely outside the track 40 (e.g., the support assembly 30 may be completely removed from and/or inserted into the track 40).

With embodiments, the actuator 120 may be lifted and/or rotated to move the latch 100 between the second position and the third position. For example and without limitation, the actuator 120 may be rotated about 30 degrees (or more or less) from the position of the actuator 120 when the latch 100 is in the second position. When the latch 100 is in the third position, the actuator 120 may be substantially perpendicular to the Z-direction, and/or a greater portion of the actuator 120 may be disposed outside the second housing member 62 than when the latch 100 is in the second position.

With embodiments, such as generally illustrated in FIGS. 5A, 5B, 5C, and 5D, the actuator 120 may include one or more clamp portions 126. When the latch 100 moves from the third position to the first position, the clamp portions 126 may rotate into engage/contact a top surface of the first support portion 84A and/or the second support portion 84B, which may be substantially fixed. Engagement between the clamp portions 126 and the support portions 84A, 84B may cause the actuator 120 to move vertically (e.g., upward in the Z-direction), which may cause the rod 110 may move vertically (e.g., within one or more of the apertures 114). For example and without limitation, the rod 110 may move from bottom portions of the apertures 114 to top portions of the apertures 114. Movement of the rod 110 in the Z-direction may cause the latch 100 and/or the engagement portion 102 to move in a similar manner. For example and without limitation, as the rod 110 moves upward, the latch 100 may move upward to clamp the engagement portion 102 onto the track 40. The clamping force, generated via the engagement between the clamp portions 126 and the support portions 84A, 84B, may be great enough to restrict and/or substantially prevent movement of the support assembly 30 in the X-direction along the track 40. The friction element 106 may facilitate restricting X-direction movement of the support assembly 30 and/or may compress/deform under the clamping force. The latch 100 may be the only component of the track assembly 20 and/or the support assembly 30 configured to restrict and/or prevent movement of the support assembly 30 in the X-direction. The latch 100 may selectively restrict or prevent movement of the support assembly 30 relative to the track 40 in the X-direction and/or the Z-direction.

In embodiments, as the actuator 120 moves from the first position toward the third position, the clamp portions 126 may disconnect from the top surfaces of the support portion 84A, 84B, which may allow the clamp portions 126 to move downward the rod 110 to move downward within the apertures 114, and/or the latch 100 to unclamp from the track 40. The clamp portions 126, the first support portion 84A, and/or the second support portion 84B may include generally curved and/or rounded shapes. A curved shape of the clamp portions 126 and/or the support portions 84A, 84B may facilitate engagement of the clamp portions 126 with the support portions 84A, 84B.

Figure 6:
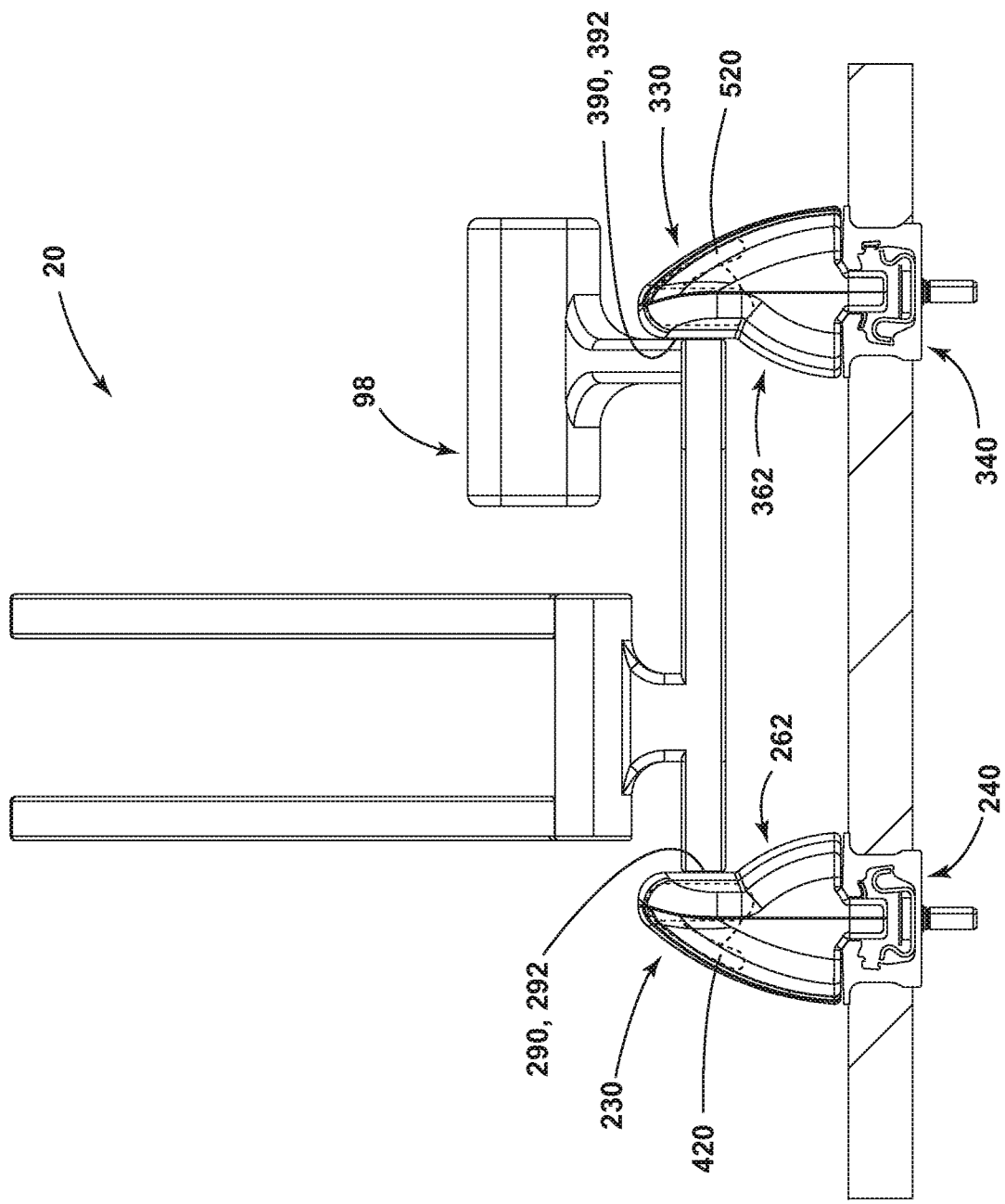
FIG. 6 is a side view of an embodiment of a track assembly according to teachings of the present disclosure.

In embodiments, such as generally illustrated in FIG. 6, a track assembly 20 may include a first support assembly 230 and/or a second support assembly 330. The track assembly 20 may include a first track 240 and a second track 340. The first support assembly 230 may be connected to the first track 240, and/or the second support assembly 330 may be connected to the second track 340. The first support assembly 230 may be disposed opposite the second support assembly 330, such that a second housing member 262 of the first support assembly 230 and a second housing member 362 of the second support assembly 330 face inward. An object 98 may be connected to connecting portions 290, 292, 390, 392 of the first support assembly 230 and/or the second assembly 330. A first support assembly 230 may be configured to move with the second support assembly 330. For example and without limitation, the first support assembly 230 and the second support assembly 330 may be moved along the tracks 240, 340 in the X-direction at the same time, and/or the first support assembly 230 and the second support assembly 330 may be removed from the tracks 240, 340 in the Z-direction at the same time (such as if actuators 420, 520 of the first support assembly 230 and the second support assembly 330 are both actuated).

Figure 7B:
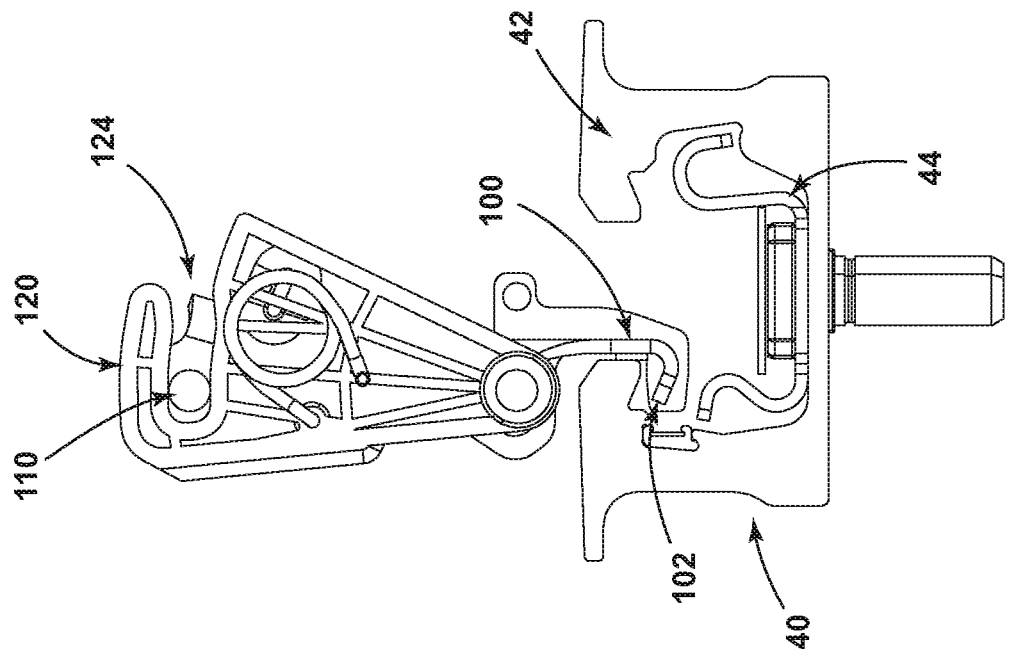
FIGS. 7A and 7B are cross-section views generally illustrating portions of an embodiment of a track assembly in a first position and a second position, respectively, according to teachings of the present disclosure.
Figure 7A:
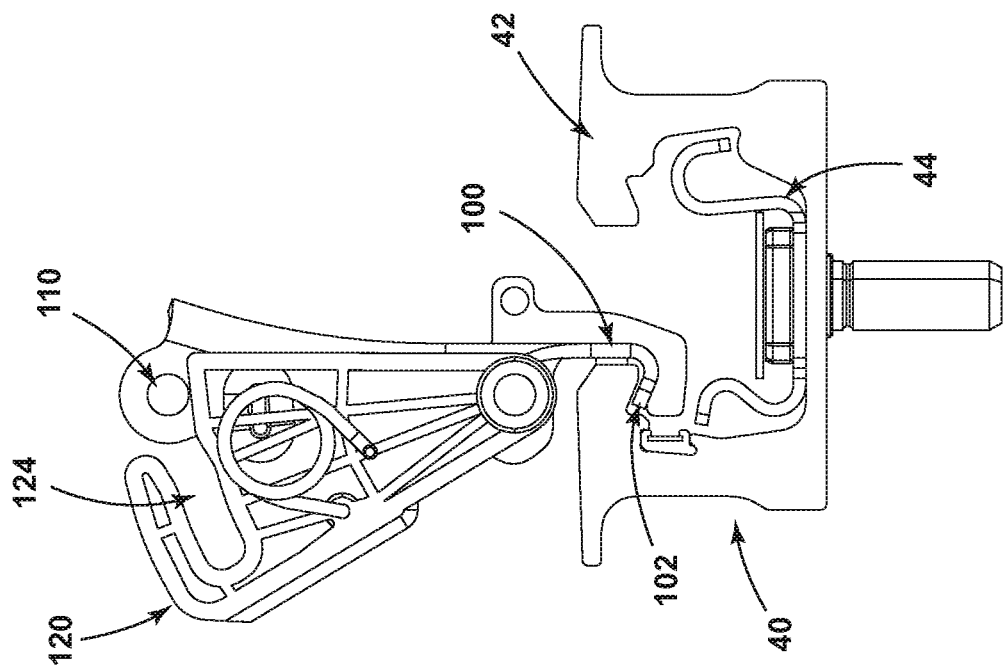

In embodiments, such as generally illustrated in FIGS. 7A and 7B, the support assembly 30 may be selectively connected to the track 40 via a slot 124 of the actuator 120. The slot 124 may at least partially receive the rod 110 and/or may be substantially curved. The rod 110 may be configured to contact an inner surface of the slot 124 and/or move vertically (e.g., in the Z-direction) as the actuator 120 moves (e.g., rotates). The actuator 120 may rotate towards a center of the track 40 to disengage the engagement portion 102 from the track 40. The slot 124 may facilitate movement of the rod 110 in the Z-direction towards the track 40 such that the engagement portion 102 may no longer be in contact with the track 40. As the actuator 120 may rotate away from a center of the track 40, the rod 110 may move in the Z-direction away from the track 40 such that the engagement portion 102 may be in contact with the track 40. The clamping force created by the contact between the engagement portion 102 (e.g., the friction element 106) and the track 40 may substantially restrict movement in the X-direction and/or the Z-direction.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A track assembly comprising:
   a track; and
   a support assembly configured for connection with the track, the support assembly including:
   a housing;
   a support member;
   an actuator;
   a rod;
   a latch configured to rotate about or with the rod; and
   an engagement portion extending from the latch;
   wherein the engagement portion is configured to selectively engage an inner surface of the track;
   the support member is configured to be removed from the track; and
   the housing includes a contact portion configured to contact a top side of the track.

2. The track assembly of claim 1, wherein the latch has a first position, a second position, and a third position;
   the housing includes a longitudinal axis;
   the actuator is configured to rotate about the longitudinal axis; and
   the actuator is configured such that when the latch is in the first position, the actuator is flush with an outer surface of the housing.

3. The track assembly of claim 1, wherein the latch has a first position, a second position, and a third position; and
   when the latch is in the third position, the engagement portion is configured to not engage the track.

4. The track assembly of claim 3, wherein the engagement portion is configured to contact the track when the latch is in the first position; and
   when the latch is in the first position, movement of the support assembly is limited in three directions.

5. The track assembly of claim 4, wherein the engagement portion is configured not to engage the track when the latch is in the second position; and
   when the latch is in the second position, movement of the support assembly is limited in two directions.

6. The track assembly of claim 1, wherein the actuator is configured to move the latch between a first position, a second position, and a third position; and
   in the first position of the latch, one or more clamp portions of the actuator are engaged with respective support portions of the housing to clamp the latch with the track and substantially prevent longitudinal movement of the support assembly relative to the track.

7. The track assembly of claim 6, wherein engagement between the clamp portions and the support portions is configured to move the actuator vertically such that the rod moves vertically in an aperture of the support member.

8. The track assembly of claim 6, wherein, in the first position of the latch, engagement of the clamp portions with the respective support portions provides a vertically clamping force to the latch onto an underside of the track.

9. The track assembly of claim 8, wherein, in the second position and the third position of the latch, the one or more clamp portions are disengaged from the respective support portions and the rod is disposed in a bottom portion of an aperture of the support member.

10. The track assembly of claim 1, wherein the track includes an inner track and an outer track; and
the latch is configured to clamp onto the outer track.

11. The track assembly of claim 1, wherein the rod is configured to move vertically in an aperture of the support member.

12. A track assembly comprising:
a track; and
a support assembly configured for connection with the track, the support assembly including:
a housing;
a support member;
an actuator;
a rod;
a latch configured to rotate about or with the rod; and
an engagement portion extending from the latch;
wherein the housing includes a first housing member connected to a second housing member; and upper portions of the first housing member and the second housing member are configured to contact top sides of the track.

13. A support assembly comprising:
a housing including a first housing member and a second housing member;
a support member disposed at least partially in the housing;
an actuator; and
a latch including an engagement portion;
wherein the actuator and the latch are rotatably connected to the support member; the engagement portion is configured to selectively engage a track;
the support member is configured to be removed from said track;
the first housing member includes a first contact portion;
the second housing member includes a second contact portion; and
the first contact portion and the second contact portion are configured to contact top sides of said track to support the support assembly on said track.

14. The support assembly of claim 13, wherein the support member includes a first support portion and a second support portion;
the first support portion and the second support portion extend laterally from the support member; and
the first support portion and the second support portion are disposed in contact with a first protrusion and a second protrusion of the first housing member.

15. The support assembly of claim 13, including a second support member and a second track;
wherein the second support member is configured to selectively engage the second track; and
the second support member is configured to cooperate with the support member to support and restrict movement of an object.

16. The support assembly of claim 13, wherein the actuator is configured to rotate and to move vertically.

17. The support assembly of claim 13, including a rod;
wherein the actuator includes a slot configured to facilitate vertical movement of the rod.

18. The support assembly of claim 13, wherein the actuator includes a curved clamp portion configured to rotate with the actuator to engage a support portion of the support member and move the latch.

\* \* \* \* \*